United States Patent [19]

Lewine et al.

[11] 4,231,089
[45] Oct. 28, 1980

[54] DATA PROCESSING SYSTEM WITH APPARATUS FOR CORRECTING MICROINSTRUCTION ERRORS

[75] Inventors: Donald A. Lewine; Thomas M. Dundon, both of Marlborough; Ronald J. Setera, Leominster, all of Mass.

[73] Assignee: Digital Equipment Corporation, Maynard, Mass.

[21] Appl. No.: 969,956

[22] Filed: Dec. 15, 1978

[51] Int. Cl.³ ............................................. G06F 11/16
[52] U.S. Cl. ....................................... 364/200; 371/10
[58] Field of Search ... 364/200 MS File, 900 MS File, 364/200, 900; 235/303.1, 307; 371/10

[56] References Cited

U.S. PATENT DOCUMENTS 4,084,236  4/1978  Chelberg et al. ................... 364/200

*Primary Examiner*—Raulfe B. Zache
*Attorney, Agent, or Firm*—Cesari & McKenna

[57] ABSTRACT

In a data processing system, a method and apparatus which enable an erroneous microinstruction word to be rewritten before it is executed. After the microinstruction word is written from memory into a control register, a parity network coupled to the control register determines whether a correct microinstruction is being executed. Upon a parity error being detected, the clock pulses to the data paths coupled to the control register are inhibited. The original microinstruction word is then fetched from secondary storage and rewritten into the microinstruction memory with the aid of a separate register providing the address to the microinstruction memory. Upon rewriting the microinstruction memory, the signal inhibiting the clock pulses is removed thereby allowing a new microinstruction to be executed. An additional feature includes apparatus for determining whether an error has previously occurred for the same microinstruction word, in which case a critical fault occurs and remedial maintenance is necessary.

10 Claims, 2 Drawing Figures

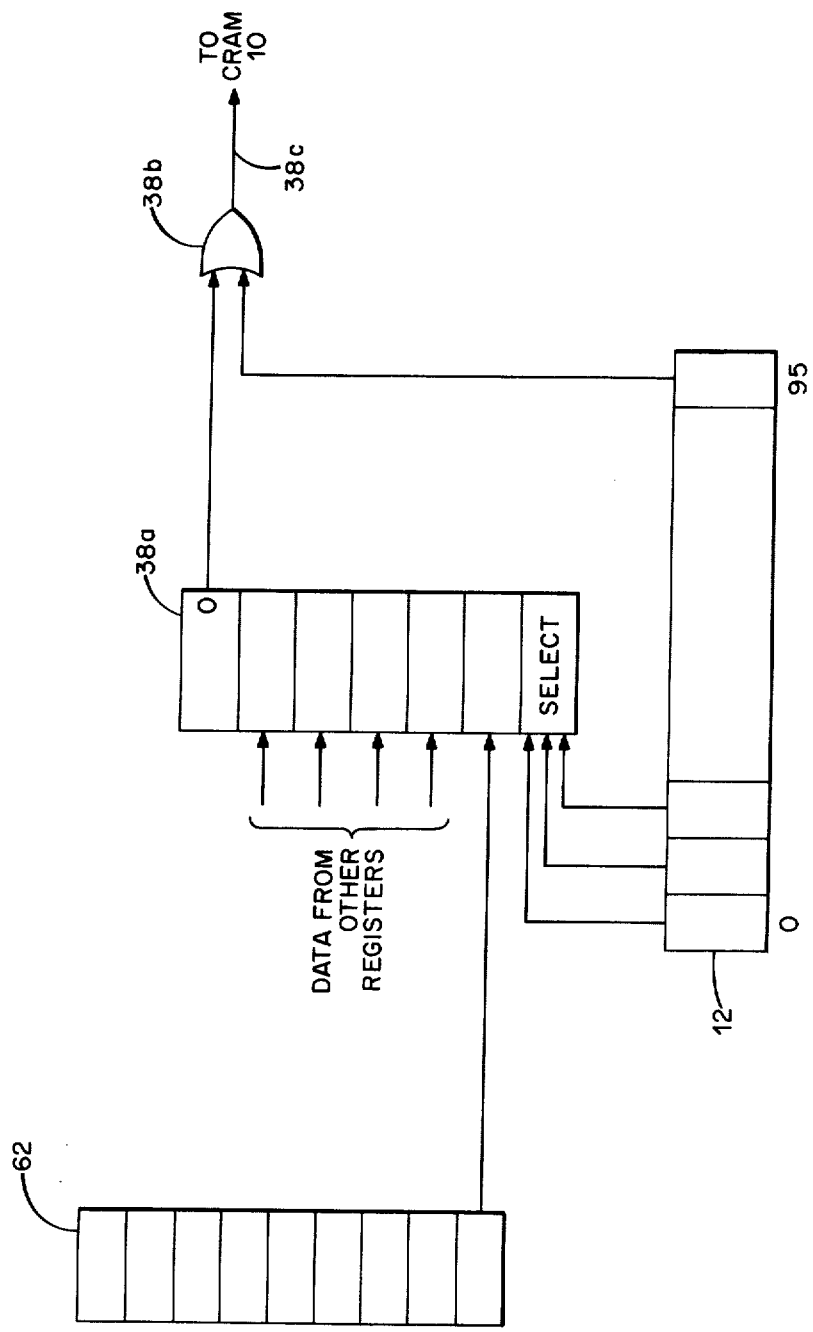

DATA PROCESSING SYSTEM WITH APPARATUS FOR CORRECTING MICROINSTRUCTION ERRORS

CROSS REFERENCE TO U.S. PATENTS AND PUBLICATIONS

DECSYSTEM-2020 Reference Manual—Digital Equipment Corporation, copyrighted 1978.

U.S. Pat. No. 3,815,099 by Cohen et al issued on June 4, 1974 for "Data Processing System" and assigned to the same assignee as the present invention.

U.S. Pat. No. 3,614,741 by McFarland, Jr., et al issued on Oct. 19, 1971 for "Data Processing System with Instruction Addresses Identifying One of a Plurality of Registers (Including the Program Counter)" and assigned to the same assignee as the present invention.

FIELD OF THE INVENTION

This invention generally relates to data processing systems and, more specifically, to an apparatus that corrects microinstruction words used to control operations in a data processing system.

BACKGROUND OF THE INVENTION

To the best of Applicants' knowledge, there are two relevant prior art schemes which deal with correcting erroneous instructions. One prior art system is an error detection and correction arrangement. This involves an error correction system which introduces a number of parity bits in the word to be executed. When a parity error has been determined, the error correction circuitry determines the location of the error (usually a bit which has failed) and corrects the error. Under this approach, the intended operation of the data processing system must be delayed until the error correction logic has completed its operations. Since most of the time there is no error detected, the overall processing throughout is deleteriously affected. In addition, the parity circuitry required for this operation is complex since a number of additional bits are required in order to determine exactly where the error has occurred. More importantly, the error correction scheme does nothing to determine whether the basic data was itself bad; it merely determines whether an error has occurred in the reading of data. If the data was bad to begin with, the error correction system does nothing to indicate this problem.

The second prior art system involves the storing of a bad instruction upon its being detected, with the data processing system remembering (i.e., storing) the operations which occurred after the bad instruction, up to the time it was detected as bad. Upon determining the error, the data processing system uses the stored information about the intervening operations to "reset" its condition, so that the operations associated with the error are negated. The problem with this approach is that the circuitry required is quite detailed and complex and adds significantly to the overall cost of the machine. More importantly, the execution of a bad instruction can have some subtle side effects which even the most detailed logic and "resetting" will not be able to cure.

The present invention greatly improves over both of the above schemes while introducing only a few additional elements. Further, the present invention works from an initial premise or assumption that the incorrect instruction was caused by a transient or temporary hardware fault rather than a permanent or "hard" hardware breakdown. If, however, a second error occurs consecutively for the same location, then the presumption shifts and it is presumed that there is a "hard" hardware failure requiring remedial action. The present invention also provides for signalling the occurrence of such second errors so that such remedial action can be taken.

OBJECTS OF THE INVENTION

It is therefore an object of this invention to provide a data processing system that is able to inhibit execution of an incorrect instruction.

It is a further object of this invention to provide a data processing system which is simple, straightforward and requires little additional circuitry to effectuate the above objective.

SUMMARY OF THE INVENTION

In accordance with this invention, a data processing system has a parity network which is responsive to the output of a microinstruction memory. If an error is detected by the parity network, a parity error circuit is set. The parity error circuit inhibits the master clock signals associated with the data path which is established by the microinstruction word. A console within the data processing system detects the parity error flag and subtracts the address for the microinstruction from a predetermined location in its memory. This operation determines whether the same microinstruction has previously been in error. If the comparison indicates that the same error has occurred, remedial maintenance action is required. If the error is in a different location, the console obtains from a secondary storage device the correct microinstruction and transfers it to the microinstruction memory. The console then enables the clearing of the parity error flag and the master clock signals so that the correct microinstruction is executed.

The invention is pointed out with particularity in the appended claims. The above and further objects and advantages of this invention may be better understood by referring to the following detailed description taken in conjunction with the accompanying drawings.

BRIEF DESCRIPTION OF THE DRAWINGS

FIG. 2 is an expanded schematic diagram of CRAM address logic 34, showing the alternative register providing the address to the microinstruction memory.

DETAILED DESCRIPTION OF THE PREFERRED EMBODIMENT

Figure 1:
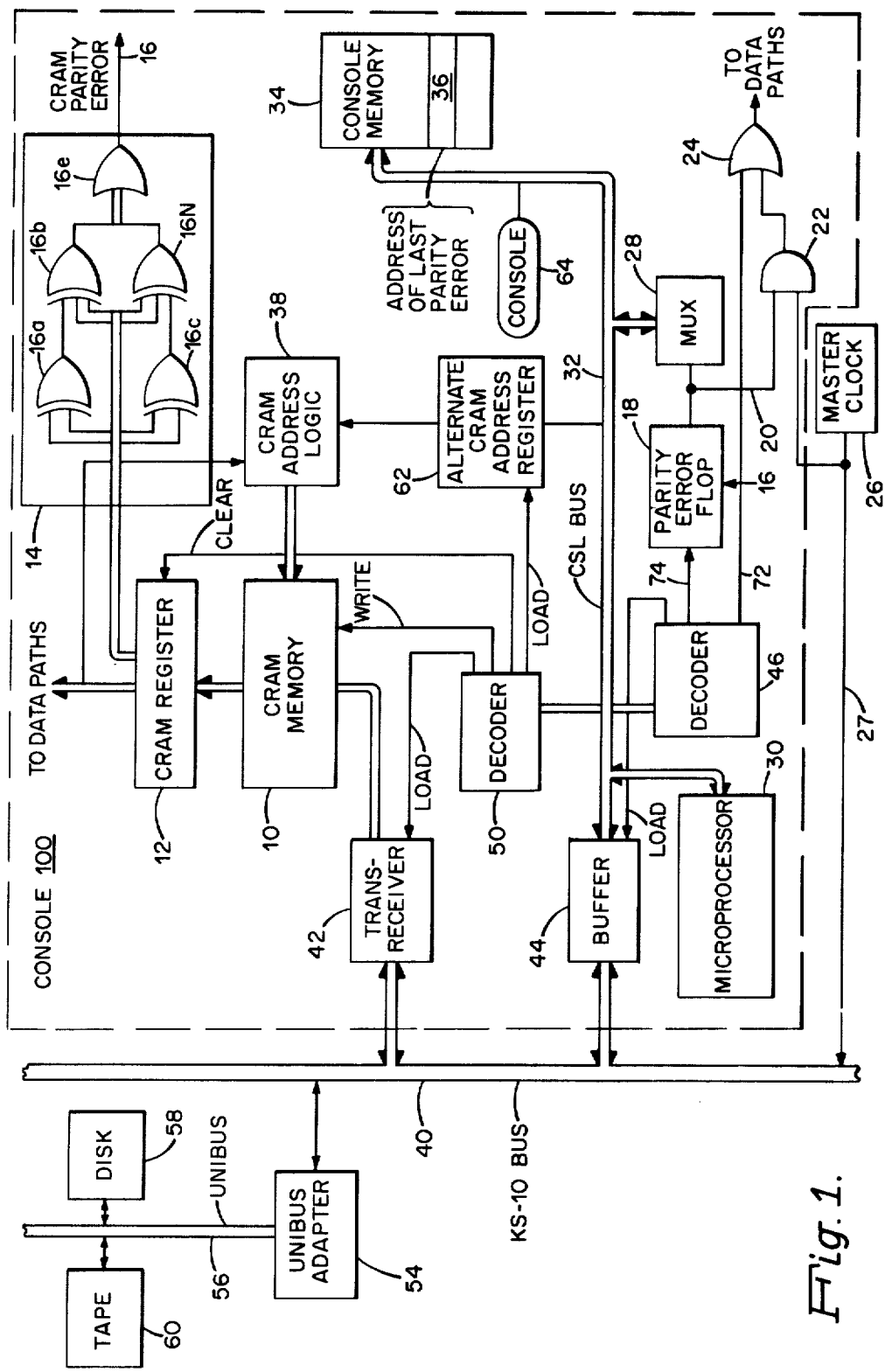
FIG. 1 is a block diagram of a data processing system that is adapted for correcting microinstruction words.

The data processing system incorporating the present invention is the KS10 processor announced by Digital Equipment Corporation in February of 1978 as a 2020 processor. The present description provided hereinafter identifies the operation of the data processing system insofar as the circuitry and its operation is required to describe the innovation made, it being recognized that data processing systems by their nature are very complex and that other operations are occurring simultaneously with the hereinafter disclosed operation. In this respect, reference should be made to the publications hereinbefore cited which identify such additional operations.

The organizational structure of the data processing system to which the instant innovation relates is viewed as a heirachy of buses, each of which is a data path shared by a number of different logical elements. The overall data processing system comprises four or more major units or subsystems that communicate with one another. Each subsystem in turn is made up of secondary components grouped around one or more of the secondary buses or data paths. In almost all cases, the buses are bidirectional. At the system level, a backpanel bus has a single set of data lines over which any subsystem can communicate with any other subsystem, although there are limitations on which subsystems may initiate transactions with other subsystems.

The minimal four subsystems in the above data processing system are: a processor, memory, console and an in/out subsystem based on a UNIBUS device interconnection scheme. (UNIBUS is a trademark of Digital Equipment Corporation, Maynard, Mass.) The description provided hereafter will concentrate on the console and how it relates to the other subsystems in order to perform the needed operations.

Referring now to FIG. 1, a control random access memory (CRAM) 10 is shown. CRAM 10 is a 96-bit word by 2K word memory which stores the microinstructions upon which the console subsystem executes. CRAM 10 includes a two bit parity network, one parity bit being for bits zero to 35 of each word of the CRAM, and the second parity bit being for bits 36 to 95 of the CRAM words. CRAM 10 is coupled to an output control register 12 which stores the particular microinstruction to be executed. At the end of each processor cycle, the clock triggers the events for one microinstruction and loads the next microinstruction into register 12 from CRAM 10. Control register 12 has two outputs, one to data paths as generally indicated in FIG. 1, and a second output to CRAM parity error logic 14. CRAM parity error logic 14 is essentially a network of exclusive OR gates which generate two parity signals from CRAM 10, to control the operation of register 12. Basically, the exclusive OR gates (16a to 16n as shown in FIG. 1) combine all the bits in the microinstruction word provided to control register 12, to provide two inputs into an OR gate 16e. If the input signals to OR gate 16e indicate even parity, no enabling signal over line 16 is generated by OR gate 16e. If, however, OR gate 16e receives an odd parity, i.e. a high signal, then over line 16 an enabling signal is provided indicating that there is an error in the microinstruction word.

The output of CRAM parity logic 14 is provided over line 16 into the set input of parity error flip flop 18. More specifically, line 16 is coupled to the set input of flip flop 18 thereby causing the output of flip flop 18 to become high. Flip flop 18 is also responsive to a clear signal which causes its output to become zero. Thus, flip flop 18 is an asynchronous logic element responsive to a condition as it exists.

Coupled to the output of parity error flip flop 18 are a number of AND gates 22, only one being shown in the drawing. AND gates 22 have an output coupled to OR gates 24 and a second input from a master clock 26. OR gate 24 presents a timing pulse to logic in the data processing system which controls the transfer of data and is hereinafter described as data paths. This logic would be responsive to the output of CRAM register 12 to perform the particular operation that the data processing system required. Master clock 26 may, for example, be a crystal oscillator that generates a 6.66 MHz clock pulse train to the entire data processing system. Thus, master clock 26 provides synchronous clock pulses for the memory subsystem, processor subsystem and other subsystems in the data processing system. In addition, master clock 26 is coupled to AND gate 22 to provide clock signals for operation of the microinstruction generated from CRAM memory 10. However, in the particular instance herein used, AND gate 22 may inhibit the provision of master clock signals to the data paths when a particular condition occurs, thereby essentially freezing the state of the machine. This is important if an erroneous microinstruction were about to be executed. For example, as shown in FIG. 1, a parity error condition signalled by parity error flip flop 18 via line 20 may be employed as an inhibiting condition.

Parity error flip-flop 18 is also coupled to a multiplexer (MUX) 28. MUX 28 is sensed, via an interconnection bus 32, by a microprocessor 30 which may, for example, be model 8080 microprocessor "chip" made by Intel Corporation. As is well known, a microprocessor has its own arithmetic and logic unit, control and storage registers and input/output circuitry for providing data, commands, etc. No description of the 8080 chip is provided herein since it is a standard component in industry; however, the functions of the 8080 as they pertain to the present invention will be described. Microprocessor 30 has its instructions executed over a CSL bus 32. CSL bus 32 is an 8-bit bus and is coupled to console memory 34 as well as to MUX 28 and microprocessor 30. One of the locations in memory 34 is designated as 36. Memory location 36 stores the address of the last CRAM memory error which was detected when parity error flip flop 18 was enabled. Thus, this address would be the same address as CRAM address logic 38 which addresses CRAM memory in normal operation.

In addition to the CSL bus 32, there is another bus called the KS10 bus 40. KS10 bus 40 is a synchronous backplane bus that provides control and data paths between the console, central processing unit, memory and I/O controllers. The bus 40 carries out the functions of memory data transfers, I/O register data transfers, system synchronization and system reset and power fail error indication. Since bus 40 is a 36-bit bus and bus 32 is an 8-bit bus, bufferring is necessary of the words, commands, instructions, etc. to be transferred between those buses. As a result, buffers 42 and 44 have been depicted, it being recognized that there are many of these particular circuits attached to the buses. Buffers 42 and 44 are capable of driving and receiving data from the bus. All information that connects to the bus 40 or 32 is transferred through the buffer elements which merely store the information and then are enabled in order to pass such information onto the bus. The enabling of buffers 42 and 44 occurs by operation of decoders 46 and 50, which in the present example are shown to be connected to CSL bus 32.

Decoders 46 and 50 are responsive to certain commands over the CSL bus, and in response to such commands enable certain signals to be transferred to designated logic elements. Microprocessor 30 can direct the data in either of buffers 42 or 44 to be transferred in either direction, depending upon the commands it generates. Also coupled to KS10 bus 40 is a UNIBUS adaptor which converts the 36-bit signals it receives from KS10 bus into 16-bit signals which are provided over UNIBUS 56. UNIBUS 56 has been described in the previous patents hereinbefore recited. UNIBUS 56 is coupled to second, UNIBUS compatible peripheral storage elements, such as disk 58 and tapes 60. Disk 58 may, for example, store the microinstructions which are used in CRAM memory 10 in addition to other information. Such storage, commonly called "secondary," provides a good back-up mechanism in case an error occurs in CRAM memory 10 and need for the original data is required.

Also shown in FIG. 2 is an alternate CRAM address register 62. Register 62 is connected to microprocessor 30 and can directly receive an address from CSL bus 32 to address CRAM memory 10 via CRAM address logic 38. More specifically, referring to FIG. 2, CRAM address logic 38 includes a multiplexer (MUX) 38a which selects one of a number of inputs based upon certain bit combinations received from CRAM register 12. One of the bit combinations can be from alternate CRAM address register 62. MUX 38a then transfers this output to an OR gate 38b which combines the output selected with certain bits from CRAM register 12 to provide one bit as part of the bit address that addresses CRAM memory 10.

Referring now to FIG. 1, the logic presently described, which is on the right hand side of the KS10 bus as shown in FIG. 1, represents the console 100. As previously described, console 100 is one of the major subsystems of the KS10 processor. The operation of the console subsystem is now described starting with the assumption that the data processing system has been properly functioning and at the present moment CRAM 10 has read an erroneous word into CRAM control register 12. CRAM parity error logic 14 via exclusive OR gates 16a through 16n receives the bit combination stored in CRAM register 12 and generates parity signals to OR gate 16e. Since an error has occurred, the outputs over one of the input lines to OR gate 16e will be a binary one, i.e., a high signal, thereby producing a high signal on line 16 and setting parity error flip-flop 18. Parity error flip-flop 18, in turn, provides a signal over its output 20 to AND gate 22. With a low input from line 20, AND gate 22 does not transmit any clock signals to OR gate 24 or, correspondingly, to data paths associated with the console. However, the other synchronous clock signals from master clock 26 are provided via the KS10 bus to other subsystems within the data processing system, including MOS memory, the UNIBUS adaptor, etc. The output of the parity error flag logic (i.e., flip-flop 18) is also provided to multiplexer 28. MUX 28 is sensed frequently by microprocessor 30. Upon microprocessor 30 sensing that a parity error flag has been generated, microprocessor 30 branches from the set of routines that it is performing and initiates a routine that will reset the parity error flip-flop by obtaining a new microinstruction word for CRAM memory 10 and then resetting parity error flip-flop 18.

More particularly, microprocessor 30 initiates a subtraction operation with one operand being the address stored in CRAM address logic 38 and the second operand being from register 36 and console memory 34. Both these operands are transferred over CSL bus 32 into microprocessor 30 with the subtraction operation being performed. If the results are equal to a zero, microprocessor 30 branches to a routine which enables a command to be placed on a console or display 64 indicating that remedial maintenance is required. Obviously, a zero difference means that the last address as provided by CRAM address logic 38 had the same error location as indicated by the operand stored in location 36, which was the previous last error location. Because two errors occurred at the same address, it is highly likely that there is a persistent hardware problem, and that as a result, for example, the memory module may have to be replaced. If, however, a non-zero result is obtained by microprocessor 30, a branch is made by microprocessor 32 to rewrite the CRAM memory location.

Microprocessor 30 provides a command over bus 32 via decoder 64 which initially clears control register 12, making it all zeros, and concurrently provides over CSL bus 32 to memory 34 the new address for the latest CRAM error. Also, with CRAM register 12 now having all zeros, CRAM address logic 38 will essentially be responsive to alternative CRAM address register 62. Microprocessor 30 then begins the operation of obtaining the information from a secondary storage device, such as disk 58, and providing it to CRAM memory 10. In performing this operation, microprocessor 30 issues a command over CSL bus 32; the command is loaded into buffer 44 and then driven over KS10 bus 40 to UNIBUS adaptor 54, and over UNIBUS 56 to disk 58. This command identifies that the status information of the present disk location should be transmitted to console memory 34 where it will be stored. The storing operation involves the transfer of the information from disk 34 over UNIBUS 56, and through UNIBUS adaptor 54, onto KS10 bus 40. UNIBUS adaptor 54 enables the 16-bit word being transferred from disk 58 to be in the 36-bit format required by KS10 bus 40. When the information from KS10 bus 40 is fed into buffer 44, it is again translated, to be transferred over 8-bit bus 32 and then stored in console memory 34. At this time the status information of the disk is saved.

Once the status information has been stored in console memory 34, microprocessor 30 issues a request for the information on disk 58 which is at the location stored in memory register 36. This command causes disk 58 to read the microcode words to be placed in CRAM 10. More particularly, microprocessor 30 provides commands over CSL bus 32 into buffer 44. Upon buffer 44 containing the entire command, microprocessor 30 issues an enabling signal through decoder 46 which drives the data from buffer 44 onto KS10 bus 40, into UNIBUS adaptor 54, which then translates the 36-bit command into 16-bit commands, over UNIBUS 56 to disk 58, to identify the disk locations to be read. Disk 58 then provides the information over UNIBUS 56, through UNIBUS adaptor 54, onto KS10 bus 40 and into buffer 44. Subsequently, microprocessor 30 enables the data from memory location 36 to be written into alternate CRAM address register 62. As shown in FIG. 2, this then addresses CRAM memory. Microprocessor 30 then issues a command signal via decoder 50, to enable alternate CRAM address register 62 to address a particular location in CRAM memory 10 with decoder 50 enabling a write operation with the information from buffer 44 to be written into the CRAM memory.

In practice, it has been found to be more efficient to rewrite the entire CRAM memory 10. As a result, the above operations for each CRAM memory address would be performed seriatim until CRAM memory 10 had each of its 2K memory words written and simultaneously addressed by alternate CRAM address register 62. As was previously indicated, since CRAM register 12 has all zeros, the multiplexer 38a enables the addresses from alternate CRAM address register 62 to address CRAM memory 10.

Upon the new microinstruction word being written into CRAM memory 10, microprocessor 30 then resets disk 58 to the status it had before the microprocessor requested the data to be written into CRAM memory 10. More particularly, microprocessor 30 enables the status information stored in console memory 34 to be transferred over CSL bus 32 into buffer 44 and then driven over KS10 bus 40, through UNIBUS adaptor 54, and UNIBUS 56, to disk 58, thereby returning disk 58 to the status that it had previously. At this point, disk 58 is located in exactly the same position that it had prior to the error being generated. Consequently, the data processing system is in the same state that it was in prior to the error being generated.

With the new information now stored in CRAM 10, decoder 46, in response to microprocessor 30, generates a signal over line 72 to OR gate 24, which signal comprises a single pulse which is a clock pulse propagated to the data paths. This single clock pulse enables the CRAM memory 10 to be addressed by CRAM address logic 38 and, more particularly, alternative CRAM address register 62, thereby enabling the microinstruction word to be written into control register 12. This new instruction then replaces the binary zeros that were previously cleared by decoder 50. Subsequently, microprocessor 30 provides a command over CSL bus 32 by which decoder 46 provides a clear input over line 74 to parity error flip-flop 18, thereby clearing the parity error and enabling a high input to be generated to AND gate 22. With this clearing signal, the master clock pulses from master clock 26 will again be re-enabled so that the data paths identified by CRAM register 12 can be enabled.

It should be noted that if before the first clock signal from AND gate 22 occurred there had been another error, CRAM parity error logic 14 would have enabled a signal over line 16 to parity error flip-flop 18, thereby inhibiting the first clock pulse being generated from AND gate 22. This results since the paths to parity error flip-flop 18 are much shorter than the data paths indicated at the output of CRAM register 12. With the new microinstruction word being correct, the microinstructions provided over data path from control register 12 may now be executed and the operation of the machine can continue.

In summary, the above implementation of the present invention separately clears the parity error flag, separately resets the CRAM memory as opposed to resetting all the registers in the data processing system, permits the reading from the disk without disturbing the state of the rest of the subsystems within the data processing system and the enabling of an error which does not disturb the rest of the subsystems within the machine.

The foregoing discussion has been limited to a specific implementation of a data processing system. However, an understanding of this specific implementation will enable the person of ordinary skill in the art to implement other logic and system designs of equivalent nature, in either the disclosed data processing system or in other data processing systems. Therefore, it is an object of the appended claims to cover all such variations and modifications as come within the true spirit and scope of this invention and may occur to those skilled in the art.

More particularly, we claim the following as our invention:

1. Apparatus for correcting instruction errors in a data processing system comprising, in combination:
   first and second instruction memory means for storing instructions in memory locations defined by addresses;
   register means for receiving and holding instructions from said first and second instruction memory means;
   instruction error detection means operable in association with the register means for evaluating an instruction held in said register means to determine whether the instruction is valid or erroneous;
   means for freezing the state of at least a portion of the data processing system in response to the detection of an erroneous instruction by the instruction error detection means; and
   means operable in response to the detection of an erroneous instruction for replacing the erroneous instruction in said register means with a corresponding valid instruction retrieved from the second instruction memory means.

2. The apparatus of claim 1 further including:
   means operatively connected to said first instruction memory means, and said replacing means for determining the address location in the first instruction memory means of such an erroneous instruction; and
   said means operable in response to the detection of an erroneous instruction for replacing the erroneous instruction in said register means with a corresponding valid instruction retrieved from a location in the second instruction memory means corresponding to the location of the erroneous instruction in the first instruction memory means.

3. The apparatus of claim 2 further including means connected to said first instruction memory means for comparing the address in said first instruction memory means of the erroneous instruction with the address of a prior erroneous instruction; and means connected to said comparing means for signalling the successive occurrence of two instruction errors at the same memory address.

4. The apparatus of claim 2 or claim 3 further including alternate address register means for receiving from said second instruction memory means the valid instruction corresponding to an erroneous instruction and for writing said valid instruction into the memory location, in the first instruction memory means, of the erroneous instruction.

5. The apparatus of claim 4 wherein the means for freezing the state of the system comprises means for inhibiting the transmission of clock pulses.

6. The apparatus of claim 1 wherein the instructions stored in the first and second instruction memory means comprise microinstructions.

7. A method of correcting instruction errors in a data processing system comprising the steps of:
   storing instruction information words in first and second sets of memory locations, each memory location being defined by an address and each address in the first instruction set corresponding to an address in the second set, such that under faultless operating conditions the same instruction information is written into corresponding addresses in the first and second set of memory locations;

for executing instructions, reading instruction information from an address in the first set of memory locations;

checking such instruction information to detect the presence of errors therein;

in response to detecting an error in such instruction information, inhibiting the operation of at least a portion of the data processing system whose operation is dependent upon the instruction information;

obtaining the instruction information from the corresponding address in the second set of memory locations and substituting it for the instruction information read from the address in the first set of memory locations; and re-establishing operation of the inhibited portion of the data processing system, whereby such portion of the data processing system operates responsively to the instruction information obtained from the address in the second set of memory locations rather than the instruction information obtained from the address in the first set of memory locations.

8. The method of claim 7 further including the step of replacing the instruction stored in said address in the first set of memory locations with the instruction obtained from the corresponding address in the second set of memory locations.

9. The method of claim 7 or claim 8 wherein the first set of memory locations and the second set of memory locations are contained, respectively, in first and second memory means which are separate from and independent of each other.

10. The method of claim 7 wherein the instruction information words comprise microinstructions.

* * * * *